(12) United States Patent
Hsiao

(10) Patent No.: US 9,330,676 B2
(45) Date of Patent: May 3, 2016

(54) DETERMINING WHETHER SPEECH INTERFERENCE OCCURS BASED ON TIME INTERVAL BETWEEN SPEECH INSTRUCTIONS AND STATUS OF THE SPEECH INSTRUCTIONS

(71) Applicant: Wistron Corporation, New Taipei (TW)

(72) Inventor: Hsi-Chun Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 198 days.

(21) Appl. No.: 14/056,960

(22) Filed: Oct. 18, 2013

(65) Prior Publication Data

US 2014/0136193 A1 May 15, 2014

(30) Foreign Application Priority Data

Nov. 15, 2012 (TW) .............................. 101142668 A

(51) Int. Cl.
*G10L 15/22* (2006.01)
*G10L 21/0208* (2013.01)

(52) U.S. Cl.
CPC .............. *G10L 21/0208* (2013.01); *G10L 15/22* (2013.01); *G10L 2021/02087* (2013.01)

(58) Field of Classification Search
CPC ................. G10L 21/0208; G10L 2021/02087; G10L 15/22
See application file for complete search history.

(56) References Cited

U.S. PATENT DOCUMENTS

| | | | | |
|---|---|---|---|---|
| 6,317,711 B1* | 11/2001 | Muroi | ............................ | 704/253 |
| 2002/0035475 A1* | 3/2002 | Yoda | ............................. | 704/270 |
| 2002/0046033 A1* | 4/2002 | Ono et al. | ..................... | 704/270 |
| 2002/0062209 A1* | 5/2002 | Choi | ............................. | 704/208 |
| 2002/0165713 A1* | 11/2002 | Skoglund et al. | ............. | 704/240 |
| 2002/0184015 A1* | 12/2002 | Li et al. | ......................... | 704/233 |
| 2003/0187659 A1* | 10/2003 | Cho et al. | ..................... | 704/275 |
| 2005/0071169 A1* | 3/2005 | Steinbiss | ....................... | 704/275 |
| 2005/0259834 A1* | 11/2005 | Ariav | ............................. | 381/110 |

(Continued)

FOREIGN PATENT DOCUMENTS

TW       I299855       8/2008

OTHER PUBLICATIONS

"Office Action of Taiwan Counterpart Application", issued on Aug. 1, 2014, p. 1-p. 12, with English translation thereof, in which the listed reference was cited.

*Primary Examiner* — Jialong He
(74) *Attorney, Agent, or Firm* — Jianq Chyun IP Office

(57) ABSTRACT

A method to filter out speech interference is provided. The method includes defining a time threshold by using a probability distribution model. When a current instruction from a speech input is recognized, a reference instruction recognized from the speech input is obtained. The current instruction is recognized right after the recognition of the reference instruction, wherein the reference instruction and the current instruction correspond to a first time point and a second time point respectively. The method includes determining whether speech interference occurs according to a comparison result of the time threshold and an interval between the first time point and the second time point as well as a state corresponding to the first time point. The method includes filtering out the reference instruction and the current instruction if the speech interference occurs, and outputting the reference instruction or the current instruction if the speech interference does not occur.

20 Claims, 5 Drawing Sheets

(56) References Cited

U.S. PATENT DOCUMENTS

2008/0300870 A1 12/2008 Hsu et al.
2009/0228272 A1* 9/2009 Herbig et al. ................. 704/233
2010/0332222 A1 12/2010 Bai et al.
2012/0316879 A1* 12/2012 Jung et al. ..................... 704/254
2013/0290000 A1* 10/2013 Newman ........................ 704/275
2013/0325484 A1* 12/2013 Chakladar et al. ............ 704/275

* cited by examiner

DETERMINING WHETHER SPEECH INTERFERENCE OCCURS BASED ON TIME INTERVAL BETWEEN SPEECH INSTRUCTIONS AND STATUS OF THE SPEECH INSTRUCTIONS

CROSS-REFERENCE TO RELATED APPLICATION

This application claims the priority benefit of Taiwan application serial no. 101142668, filed on Nov. 15, 2012. The entirety of the above-mentioned patent application is hereby incorporated by reference herein and made a part of this specification.

BACKGROUND OF THE DISCLOSURE

1. Field

The present disclosure generally relates to an application of a speech operation, in particular, to a method, a system, and a computer readable recording medium for filtering out speech interference during a speech operation.

2. Description of Related Art

A conventional speech recognition system emphasizes on distinguishing between speech and non-speech contexts from a voice input. That is, such speech recognition system mainly distinguishes between actual noises such as ambient noises or sudden noises (i.e. a clashing sound) and actual speech activities. The adapted method is based on signal processing such that the differences between acoustic models (eg. a zero-crossing ratio, energy, a spectral distribution or a pitch contour) of noises and speeches are analyzed, and it is equivalent to attribute detection on voices. When a speech activity region is detected, a process such as speech recognition is performed on the whole speech, wherein the speech recognition system only perform the recognition on the whole speech region once. The recognized result may be used as an instruction to control an electronic device so as to realize a speech operation.

However, in a usage situation of some speech recognition mechanisms required to be turned on continuously, contents of a conversation between a user and other people may also be recognized. If the user speaks out the instruction related to the contents of the instruction for controlling the electronic device during the conversation, then the instruction may be output to the electronic devices by the system. However, it is not the user's intention to perform the instruction on the electronic device, and therefore, the user may feel troublesome when the electronic device correspondingly reacts to the received instruction.

SUMMARY OF THE DISCLOSURE

The present disclosure is directed to a method, a system, and a computer readable recording medium for determining an actual intention of the user when the user speaks out a preset instruction so as to reduce misoperations of a controlled device due to speech interference.

A method for filtering out speech interference is provided in the present disclosure. The method includes defining a time threshold based on a probability distribution model. When a current instruction is recognized from a speech input, a reference instruction recognized from the speech input is obtained, wherein the current instruction is recognized right after the reference instruction, and wherein the reference instruction and the current instruction correspond to a first time point and a second time point respectively. An interval between the first time point and the second time point is obtained. It is determined whether speech interference occurs according to a comparison result of the interval and the time threshold as well as the status corresponding to the first time point. If the speech interference occurs, the reference instruction and the current instruction are filtered out. If the speech interference does not occur, the reference instruction or the current instruction is output.

In another point of view, a computer readable recording medium storing a plurality of programming codes is provided in the present disclosure. When the programming codes are loaded to a micro-processing unit, the micro-processing unit executes the programming codes so as to complete the following steps. A time threshold is defined based on a probability distribution model. When a current instruction is recognized from a speech input, a reference instruction recognized from the speech input is obtained, wherein the current instruction is recognized right after the reference instruction, and wherein the reference instruction and the current instruction correspond to a first time point and a second time point respectively. An interval between the first time point and the second time point is obtained. It is determined whether speech interference occurs according to a comparison result of the interval and the time threshold as well as the status corresponding to the first time point. If the speech interference occurs, the reference instruction and the current instruction are filtered out. If the speech interference does not occur, the reference instruction or the current instruction is output.

In another point of view, a system for filtering out speech interference including an output device, an input device, a storage device, and a processor is provided in the present disclosure. The processor is coupled to the output device, the input device, and the storage device. The output device is used for receiving a speech input. The storage device is used for storing a time threshold which is defined based on a probability distribution model. When a current instruction is recognized from a speech input, the processor is used for obtaining a reference instruction recognized from the speech input, wherein the current instruction is recognized right after the reference instruction, and wherein the reference instruction and the current instruction correspond to a first time point and a second time point respectively. The processor obtains an interval between the first time point and the second time point and determines whether speech interference occurs according to a comparison result of the interval and the time threshold as well as the status corresponding to the first time point. If the speech interference occurs, the processor filters out the reference instruction and the current instruction. If the speech interference does not occur, the processor controls the output device to output the reference instruction or the current instruction.

Based on the above description, according to an intensity level of a plurality of instructions recognized from a speech input in continuous time, it is determined whether speech interference occurs when a user speaks out the aforementioned instructions. Furthermore, in terms of two consecutive instructions recognized from a speech input in a time series, only a time interval between the two consecutive instructions and the status corresponding to the former instruction are needed for determining whether speech interference occurs in the present disclosure. By that means, a controlled device may prevent misoperations from speeches of a conversation between a user and other people or other sources so as to reduce a probability of misoperations of the controlled device.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
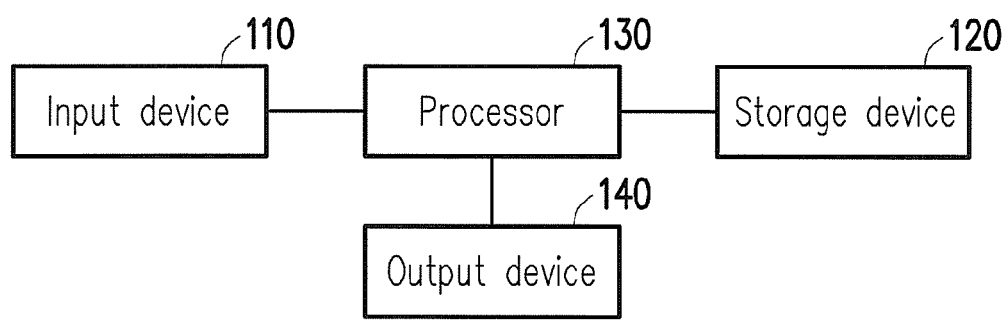
FIG. 1 is a schematic diagram of a speech interference filtering system according to an embodiment of the present disclosure.

FIG. 1 is a schematic diagram of a speech interference filtering system according to an embodiment of the present disclosure. Referring to FIG. 1, a speech interference filtering system 100 includes an input device 110, a storage device 120, a processor 130, and an output device 140. In the present embodiment, the speech interference filtering system 100 is able to determine whether an instruction recognized from a speech input is a valid instruction from a user intention to control a controlled device or speech interference from a user's conversation, a television, a broadcast, or other speeches from an ambient environment, wherein the controlled device is any voice-controllable electronic device such as, but not limited to, a television, a stereo, a DVD player, a refrigerator, an air-conditioner, or a computer. Each component of the speech interference filtering system 100 will be respectively described hereinafter.

The input device 110 is an audio input device such as a microphone used for receiving an input speech. To be more specific, the speech herein refers to a spoken human language. The input speech in the present embodiment refers to a voice signal which is already pre-processed by a voice parameter extraction or a voice activity detection for filtering out non-speech contexts caused by, for example, ambient noises.

The storage device 120 may be a storage medium such as a memory, a hard drive, a disk, a memory card, a flash drive, or a combination thereof. The storage device 120 is used for storing reference information required for the speech interference filtering system 100 when it comes to a determination and for temporarily storing any speech recognition result which has not yet been determined as the speech interference.

The processor 130 is coupled to the input device 110, the storage device 120, and the output device 140. The processor 130 may be, for example, a micro-processor, an embedded processor, or a central processing unit (CPU), and yet the present disclosure is not limited thereto. The processor 130 is used for performing instruction recognition on a received input speech from the input device 110. For example, the storage device 120 records a preset instruction set. The processor 130 is able to recognize whether an input speech is an instruction included in the instruction set. However, an input speech is normally mixed with a conversation between the user and others and human voices from a television or a broadcast, wherein the content of the speech may include an instruction within the instruction set. Such input speech is not a speech instruction that the user intends to perform an operation on the controlled device, and therefore the content of such speech is defined as the speech interference in the embodiments hereinafter. The processor 130 may perform a determination and a filtration on the speech interference. In another embodiment, the processor 130 further includes a feature of speech recognition. Therefore, the input device 110 may receive a voice input, and then the processor 130 may recognize a speech input from the voice input and then perform instruction recognition and speech interference determination. Detailed methods of the determination and filtration on the speech interference performed by the processor 130 will be described later on.

The output device 140 may include a wired and/or wireless transmission module and output a valid instruction determined as non-speech interference to the controlled device based on an instruction from the processor 130. By that means, the controlled device is able to react to the user's requirement based on the instruction.

Figure 2:
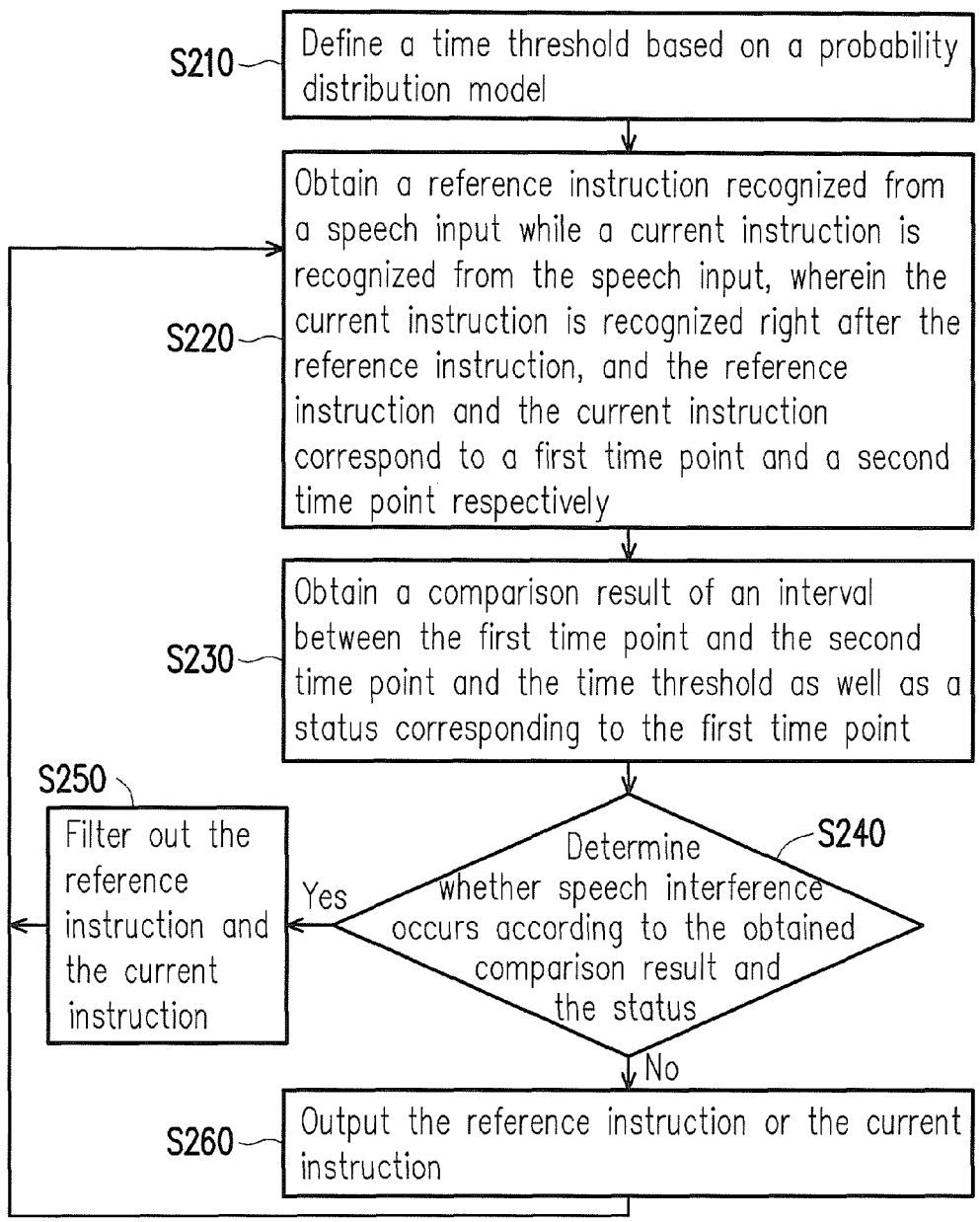
FIG. 2 is a flowchart of a method for filtering out speech interference.

FIG. 2 is a flowchart of a method for filtering out speech interference. A detailed operation method of the speech interference filtering system 100 will be described along with FIG. 1 and FIG. 2.

First, as illustrated in Step S210, a time threshold is defined based on a probability distribution model. In the present embodiment, the probability distribution model is a Poisson distribution model expressed as Equation (1):

$$P(X=k) = \frac{\lambda^{-k} e^{-\lambda}}{k!} \qquad (1)$$

wherein k is a variable denoted as the number of occurrences, and e is a base of natural logarithm. $\lambda$ is $\alpha \times t$, wherein t is a time unit, $\alpha$ is a constant (e.g. 1 or 0.25, and yet the present disclosure is not limited thereto), and $\lambda$ represents an expected value of the number of occurrences of speech interference within the time unit t. Hence, P(X=k) represents the probability of occurrences of speech interference within the time unit t, and P(X=k) follows a Poisson distribution with the parameter $\lambda$.

For example, assume that $\lambda=1$ and $\alpha=1$, then t=1. Hence, under a normal condition of the user giving an instruction through a speech, the probability of occurrences of speech interference may be expressed as Equation (2):

$$P=1-P(X=0)-P(X=1)=1-0.368-0.368=0.264 \qquad (2)$$

Moreover, assume that $\lambda=0.5$ and $\alpha=0.25$, then t=2. Hence, under a normal condition of the user giving an instruction through a speech, the probability of occurrence of speech interference may be expressed as Equation (3):

$$P=1-P(X=0)-P(X=1)=1-0.6-0.3=0.1 \qquad (3)$$

The length of the unit time t is a range acceptable by the user through experiments. Within such range, the probability of the user performing a normal speech operation falsely determined as the speech interference is less than an upper limit of the acceptable range. For example, an experimental result shows that in a situation of ten consecutive instructions being input by the user, at most one to two false determinations of the speech interference are acceptable. Hence, the length of the time unit t is between 1-2 seconds. In other words, the longest waiting time for an instruction switch is 2 seconds for most people.

The unit time t corresponding to the parameter $\lambda$ in the Poisson distribution is set as the time threshold in the present embodiment, and yet in another embodiment, a present constant (e.g. 2 seconds) may be set as the time threshold.

Then, in Step S220, when the processor 130 recognizes a current instruction from a speech input received by the input device 110, the processor 130 obtains a reference instruction which is also recognized from the speech input, wherein the current instruction is recognized right after the reference speech. In other words, the processor 130 does not recognize other instructions within a time period between the reference instruction and the current instruction are recognized. In the present embodiment, the reference instruction corresponds to a first time point while the current instruction corresponds to a second time point. For example, the first time point is a time point at which the reference instruction ends, and the second time point is a time point at which the current instruction ends.

Then, in Step S230, the processor 130 calculates an interval between the first time point and the second time point, obtains a comparison result of the time interval and the time threshold, and also obtains a status corresponding to the first time point. In more details, assume that the processor 130 firstly recognizes an instruction from the speech input at time point Ti. The processor 130 sets all the time points prior to the time point Ti to be corresponding to an idle status. Whenever the processor 130 recognizes an instruction from the speech input, it may set the time point corresponding to the instruction to be corresponding to a valid instruction status, an interference status, or an idle status. The status such that the time point corresponding to the recognized instruction should be corresponding to will be explained along with figures later on.

In step S240, the processor 130 determines whether the speech interference occurs based on the obtained comparison result and status. In the present embodiment, the processor 130 determines an intensity level of the reference instruction and the current instruction in consecutive time based on whether the interval between the first and the second time points exceeds the time threshold. If the instructions are overly intense, the probability of occurrences of the speech interference is high. Based on a status corresponding to the first time point corresponding to the reference instruction, the processor 130 further determines whether the existed instruction is from the user's intention to perform an operation on the controlled device or the speech interference occurs.

If the determined result from Step S240 is true, then in Step S250, the processor 130 may filter out the reference instruction and the current instruction. That is, the processor 130 determines that the reference instruction and the current instruction are not the instruction from the user to control the controlled device, and therefore it may not output the reference instruction and the current instruction to the controlled device so as to prevent the controlled device from making reactions unexpected from the user.

If the determined result from Step S240 is false, then in Step S260, the processor 130 controls the output device 140 to output the reference instruction or the current instruction to the controlled device. In the present embodiment, when the processor 130 decides to output an instruction recognized from the speech input, a preset waiting time may be added to a time point at which the instruction ends (i.e., the end time point of the instruction) to be an output time point of the instruction. The instruction may not be output by the output device 140 until the output time point is reached. In another embodiment, after deciding to output an instruction, the processor 130 may immediately control the output device 140 to output the instruction.

In the embodiment of FIG. 2, the processor 130 continuously performs instruction recognition on the speech input, wherein the recognized instruction may form an instruction series temporarily stored in the storage device 120. Whenever an instruction is recognized, the processor 130 may execute Step S220 to Step S260. In other words, the processor 130 may perform instruction recognition and speech interference determination simultaneously.

Figure 3:
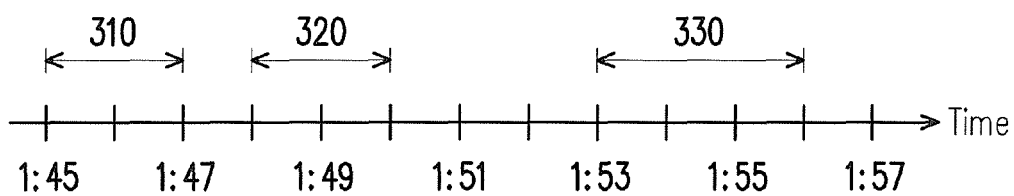
FIG. 3 is a schematic diagram an instruction series according to an embodiment of the present disclosure.

For example, FIG. 3 is a schematic diagram an instruction series according to an embodiment of the present disclosure. As illustrated in FIG. 3, the processor 130 may sequentially recognize three instructions 310, 320, and 330 with different lengths from speech input. A time point corresponding to the instruction 310 is an end time point thereof (i.e. 1 minute and 47 seconds); a time point corresponding to the instruction 320 is an end time point thereof (i.e. 1 minute and 50 seconds); and a time point corresponding to the instruction 330 is an end time point thereof (i.e. 1 minute and 56 seconds). Whenever the processor 130 recognizes an instruction, it may determine whether the speech interference occurs. In more details, in terms of the first instruction 310 recognized by the speech input, due to lacking of the reference instruction, the processor 130 may compare an interval between an initial time point of the speech input and the end time point of the instruction 310 with the time threshold, and further determine whether the speech interference occurs based on the comparison result and a status corresponding to the initial time point of the speech input (i.e. an idle status). When the instruction 320 is recognized, the processor 130 sets the instruction 310 to be the reference instruction and obtain a comparison result of an interval between the end time points of the instruction 320 and instruction 310 and the time threshold. The processor 130 then determines whether the speech interference occurs based on the comparison result and a status corresponding to the end time point of the instruction 310. Similarly, when the instruction 330 is recognized, the processor 130 set the instruction 320 to be the reference instruction and obtain a comparison result of an interval between the end time points of the instruction 330 and instruction 320 and the time threshold. The processor 130 then determines whether the speech interference occurs based on the comparison result and a status corresponding to the end time point of the instruction 320.

A detailed flow of determining whether the speech interference occurs by the processor 130 will be explained hereinafter.

In the present embodiment, the processor 130 firstly determines if the reference instruction exists. If the reference instruction exists, it represents that the current instruction is not the first instruction recognized by the speech input. The processor 130 then determines if the obtained reference instruction is filtered out or output. For example, the processor 130 may maintain an instruction information corresponding table so as to record whether each recognized instruction has been filtered out or output.

Figure 4:
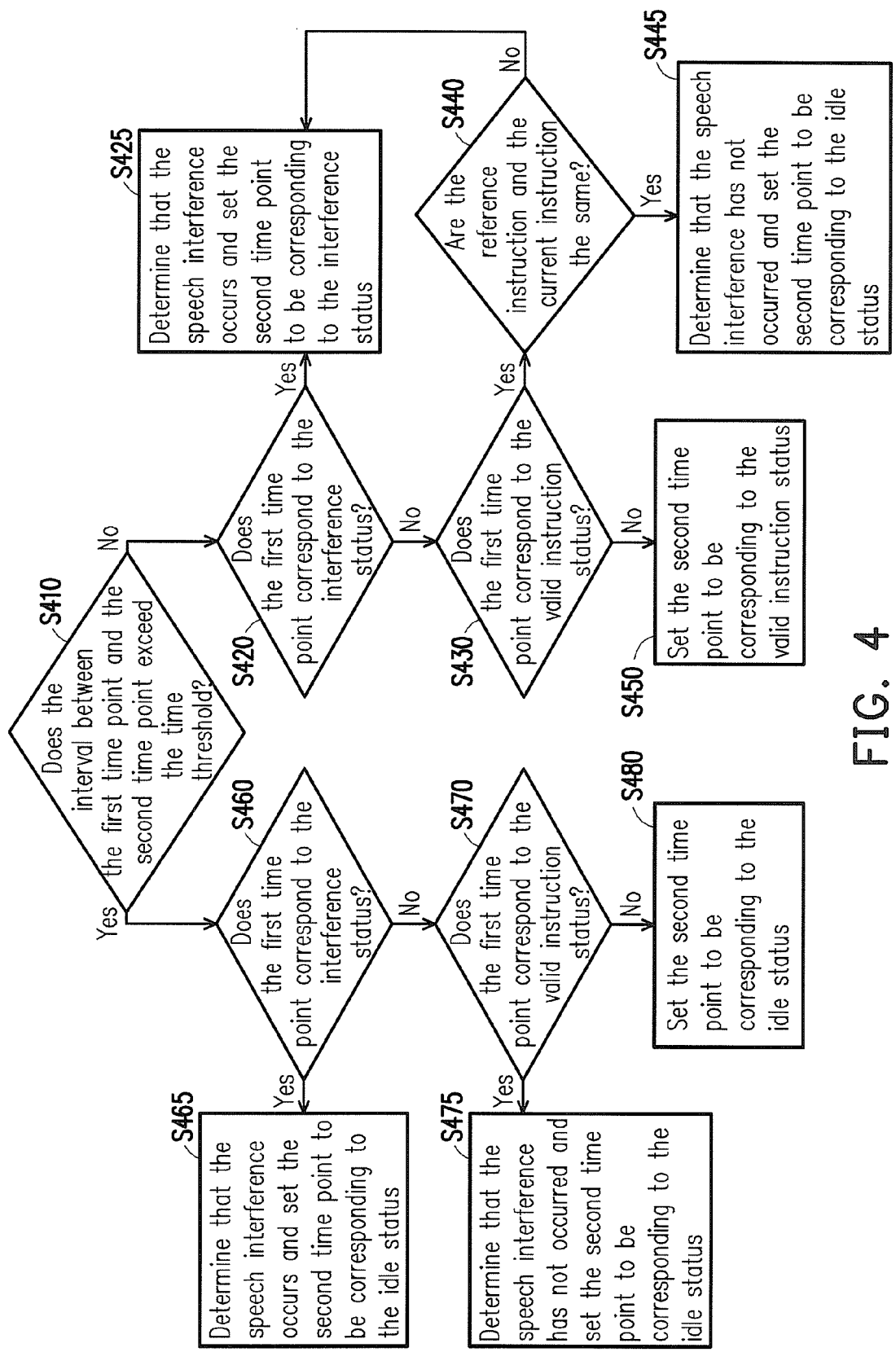
FIG. 4 is a flowchart of determining whether speech interference occurs according to an embodiment of the present disclosure.

If the reference instruction has not yet been filtered out or output, steps in FIG. 4 are executed for determination. Please refer to FIG. 4.

First, in Step S410, the processor 130 determines whether the interval between the first time point and the second time point exceeds the time threshold.

If the interval between the first and the second time points does not exceed the time threshold, in Step S420, the processor 130 determines whether the first time point corresponds to the interference status.

If the first time point corresponds to the interference status, in Step S425, the processor 130 determines that the speech interference occurs and sets the second time point to be corresponding to the interference status. Then, in Step S250, the processor 130 may filter out the reference instruction and the current instruction. In the present embodiment, the processor 130 may record the reference instruction and the current instruction as being filtered out in the instruction information corresponding table.

If the first time point does not correspond to the interference status, in Step S430, the processor 130 determines whether the first time point corresponds to the valid instruction status.

If the first time point corresponds to the valid instruction status, in Step S440, the processor 130 determines whether the reference instruction and the current instruction are the same.

If the reference instruction and the current instruction are different, in Step S425, the processor 130 determines that the speech interference occurs and sets the second time point to be corresponding to the interference status. Then in Step S250 of FIG. 2, the processor 130 may filter out the reference instruction along with the current instruction as well as update the content of the instruction information corresponding table.

If the reference instruction and the current instruction are the same, which may possibly represent that the user repeats multiple identical instructions within a short period of time due to impatience. Therefore, in Step S445, the processor 130 determines that the speech interference has not occurred and sets the second time point to be corresponding to the idle status. Then, in Step S260 of FIG. 2, the processor 130 may output the reference instruction or the current instruction as well as update the content of the instruction information corresponding table. In the present embodiment, the processor 130 selectively outputs the reference instruction or the current instruction based on a preset rule. The preset rule may be, for example, to selectively output the reference instruction firstly recognized, and yet the present disclosure is not limited thereto.

When the determined result in Step S430 is false, (i.e. the first time point corresponds to the idle status), in Step S450, the processor 130 sets the second time point to be corresponding to the valid instruction status.

In a situation of the interval between the first and the second time points exceeding the time threshold, in Step S460, the processor 130 determines whether the first time point corresponds to the interference status.

If the first time point corresponds to the interference status, in Step S465, the processor 130 determines that the speech interference occurs and sets the second time point to be corresponding to the idle status. Then in Step S250 of FIG. 2, the processor 130 may filter out the reference instruction along with the current instruction as well as update the content of the instruction information corresponding table.

If the first time point does not correspond to the interference status, in Step S470, the processor 130 determines whether the first time point corresponds to the valid instruction status.

If the first time point corresponds to the valid instruction status, in Step S475, the processor 130 determines that the speech interference has not occurred and sets the second time point to be corresponding to the idle status. Then in Step S260 of FIG. 2, the processor 130 may output the reference instruction or the current instruction as well as update the content of the instruction information corresponding table. In the present embodiment, the processor 130 may output the reference instruction.

If the first time point does not correspond to the valid instruction status, it represents that the first time point corresponds to the idle status. Then, in Step S480, the processor 130 sets the second time point to be corresponding to the idle status.

It is noted that, in Step 450 and Step 480 of FIG. 4, when the processor 130 determines that the current information is not sufficient for determining whether the speech interference occurs and requires to wait for another instruction to be recognized, it may refer to Step S220 to Step 260 of FIG. 2 for performing determination and the corresponding processes.

Figure 5:
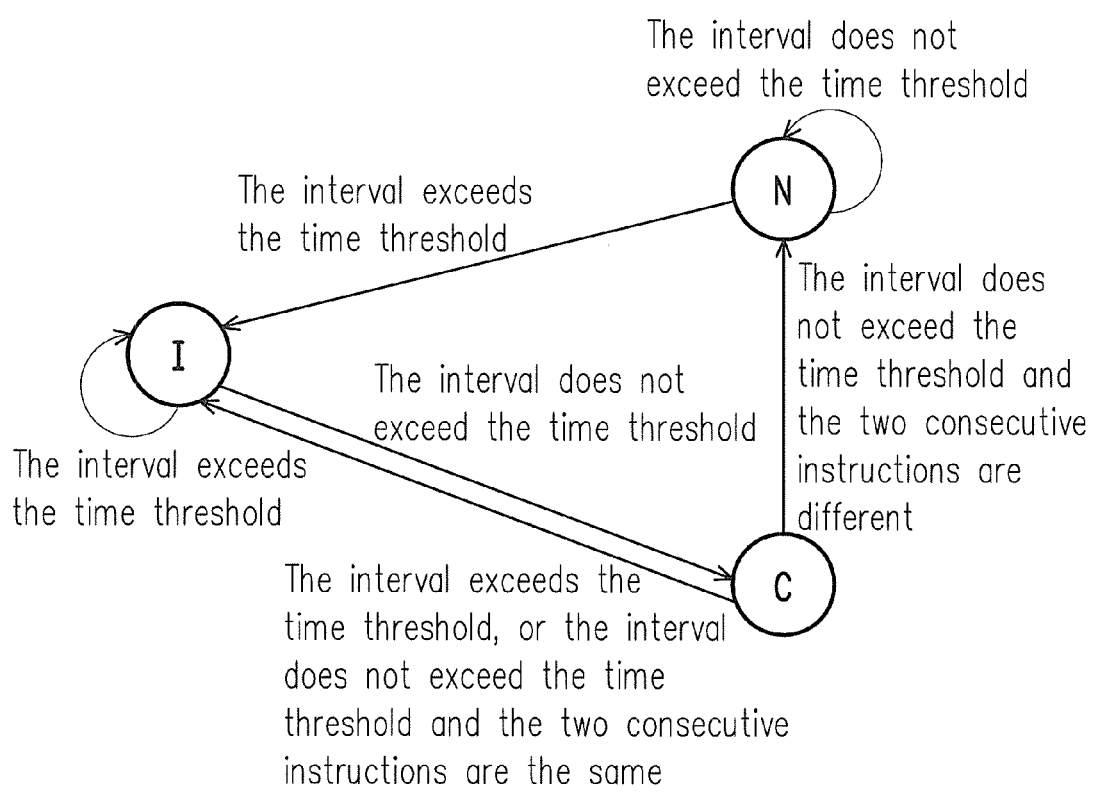
FIG. 5 is a status transition diagram between two time points according to an embodiment of the present disclosure.

In FIG. 4, the status corresponding to the second time point is related to three conditions, wherein the three conditions are the status corresponding to the first time point, whether if the interval between the first and the second time points exceeds the time threshold, and whether the reference instruction and the current instruction are the same. A transition from the statuses of the first time point to the second time point is illustrated in FIG. 5. Referring to FIG. 5, I, C, and N are denoted as the idle status, valid instruction status, and the interference status respectively. An arrow sign between two statuses represents the condition in which the transition occurs between the first time point and the second time point.

For example, if the first time point corresponds to the idle status I, and if the interval between the first and the second time points exceeds the time threshold, the second time point still corresponds to the idle status I. However, if the interval between the first and the second time points does not exceed the time threshold, the second time point may correspond to the valid instruction status C.

If the first time point corresponds to the valid instruction status C, and if the interval between the first and the second time points does not exceed the time threshold and the two consecutive instructions (i.e. the reference and the current instruction) are different, the second time point may correspond to the interference status N. If the interval between the first and the second time points exceeds the time threshold, or if the interval between the first and the second time points does not exceed the time threshold but the two consecutive instructions are the same, the second time point may correspond to the idle status I.

If the first time point corresponds to the interference status N, and if the interval between the first and the second time points does not exceed the time threshold, the second time point still corresponds to the interference status N; but if the interval between the first and the second time points exceeds the time threshold, the second time point corresponds to the idle status I.

Moreover, in a situation of the reference instruction being filtered out or output, the processor 130 determines whether the speech interference occurs based on the comparison result between the interval between the first and the second time points and the time threshold as well as the status corresponding to the first time point. The determination method is the same as or similar to FIG. 4, and will not be repeated herein. Then, the processor 130 determines whether to filter out the current instruction based on the determined result. For example, if it is determined that the speech interference occurs, the current instruction may be filtered out.

Besides, when the reference instruction does not exist, it represents that the current instruction is the first instruction recognized by the speech input. Hence, the processor 130 determines whether the interval between the initial time point of the speech input and the second time point exceeds the time threshold. If the interval exceeds the time threshold, the processor 130 sets the second time point to be corresponding to the idle status. If the interval does not exceed the time threshold, the processor 130 sets the second time point to be corresponding to the valid instruction status. In such situation, the processor 130 may not determine whether the speech interference occurs and require waiting for another instruction to be recognized, and it may refer to Step S220 to Step 260 of FIG. 2 for performing determination and the corresponding processes.

Figure 6:
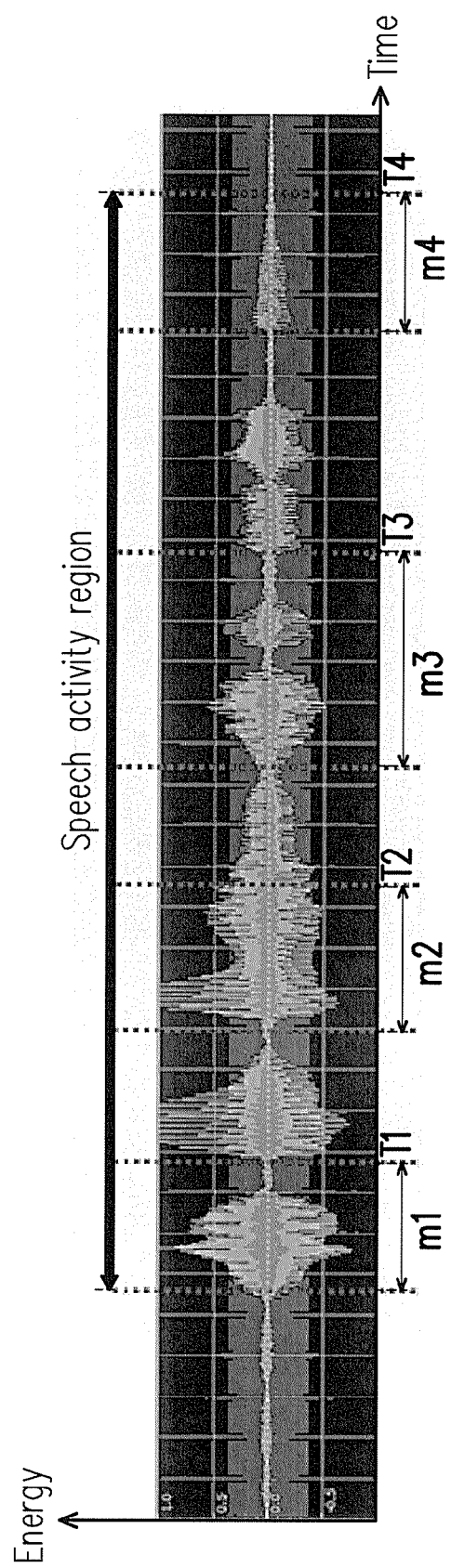
FIG. 6 is an energy wave diagram of an input voice according to an embodiment of the present disclosure.

FIG. 6 is an energy wave diagram of an input voice according to an embodiment of the present disclosure. Referring to FIG. 6, in terms of the input voice in FIG. 6, the speech interference filtering system 100 may only process the input speech within the speech activity region. Assume that the processor 130 recognizes instructions m1 to m4 in order, it represents that the user speaks out four instructions performable on the controlled device within the speech activity region. However, the processor 130 may not output the instructions m1 to m4 to the controlled device unconditionally, and yet it will determines whether the speech interference exists based on end time points T1 to T4 of the four instructions respectively. Since the determination method is the same as or similar to the aforementioned embodiments, and therefore it may not be repeated herein. In other words, the processor 130 not only recognizes the instruction correctly from the speech input, but also further confirms if the instruction is the speech interference. Then within the time period of continuously obtaining the speech input and performing instruction recognition therefrom, given that the user speaks out the contents related to the instruction (or the instruction-related content from the background) without any intention to perform operations, the recognized instruction may be prevented from being sent to the controlled device so as to reduce misoperations thereof.

Another computer readable recording medium for storing a plurality of programming codes is additionally provided in the present disclosure. When the programming codes are loaded to a microprocessor unit, such microprocessor unit may execute the programming codes so as to complete the steps or related operations of the methods in the aforementioned embodiments. The computer readable recording medium may be a read-only memory (ROM), a random-access memory (RAM), CD-ROM, a magnetic tape, a floppy disk, or an optical data storing component. Also, the microprocessor unit may be an embedded processor or a central processing unit (CPU), and yet the present disclosure is not limited thereto.

To sum up, a method and system for filtering speech interference, and a computer readable recoding medium in the present disclosure perform speech interference detection and filtration on a speech with ambient noises filtered out. Through continuous instruction recognition from an input speech, an instruction is able to be determined whether it is from a user's intention to control the controlled device or a situation of speech interference. By that means, the controlled device may be prevented from making reactions that are not made from the user's intention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for filtering out speech interference, applicable to an electronic device which comprises a processor and a microphone, the method comprising:
   defining a time threshold based on a probability distribution model by the processor;
   when a current instruction is recognized, by the processor, from a speech input received by the microphone, obtaining a reference instruction recognized from the speech input by the processor, wherein the current instruction is recognized right after the reference instruction, the reference instruction and the current instruction correspond to a first time point and a second time point respectively;
   determining whether speech interference occurs according to a comparison result and a status corresponding to the first time point by the processor, wherein the comparison result is generated by comparing the time threshold with a time interval between the first time point and the second time point, and the status corresponding to the first time point being set based on a recognition status of the speech input recognized at the first time point, wherein the status is one of a plurality of statuses, and the statuses at least comprise a first status, a second status, and a third status;
   filtering out the reference instruction and the current instruction by the processor if the speech interference occurs; and
   outputting one of the reference instruction and the current instruction by the processor if the speech interference does not occurs.

2. The method for filtering out speech interference of claim 1, wherein the first status is a valid instruction status, the second status is an interference status, and the third status is an idle status, and wherein the step of determining whether the speech interference occurs according to the comparison result and the status corresponding to the first time point further comprises:
   if the interval between the first time point and the second time point does not exceed the time threshold and if the first time point corresponds to the interference status, determining that the speech interference occurs and setting the second time point to be corresponding to the interference status;
   if the interval between the first time point and the second time point does not exceed the time threshold and if the first time point corresponds to the valid instruction status, when the reference instruction is different from the current instruction, determining that the speech interference occurs and setting the second time point to be corresponding to the interference status; and
   if the interval between the first time point and the second time point exceeds the time threshold and if the first time point corresponds to the interference status, determining that the speech interference occurs and setting the second time point to be corresponding to the idle status.

3. The method for filtering out speech interference of claim 2, wherein the step of determining whether the speech interference occurs according to the comparison result and the status corresponding to the first time point further comprises:
   if the interval between the first time point and the second time point does not exceed the time threshold and if the first time point corresponds to the valid instruction status, when the reference instruction is the same as the current instruction, determining that the speech interference has not occurred and setting the second time point to be corresponding to the idle status; and
   if the interval between the first time point and the second time point exceeds the time threshold and if the first time point corresponds to the valid instruction status, determining that the speech interference has not occurred and setting the second time point to be corresponding to the idle status.

4. The method for filtering out speech interference of claim 3, wherein the step of outputting one of the reference instruction and the current instruction if the speech interference does not occurs comprises:
when the interval between the first time point and the second time point does not exceed the time threshold, selectively outputting the reference instruction or the current based on a preset rule; and
when the interval between the first time point and the second time point exceeds the time threshold, outputting the reference instruction.

5. The method for filtering out speech interference of claim 3 further comprising:
if the interval between the first time point and the second time point does not exceed the time threshold and the first time point corresponds to the idle status, setting the second time point to be corresponding to the valid instruction status; and
if the interval between the first time point and the second time point exceeds the time threshold and if the first time point corresponds to the idle status, setting the second time point to be corresponding to the idle status.

6. The method for filtering out speech interference of claim 5, wherein after the step of obtaining the reference instruction recognized from the speech input, the method further comprises:
determining whether the reference instruction is filtered out or outputted;
if the reference instruction is filtered out or outputted, determining whether to filter out the current instruction by determining whether the speech interference occurs based on the comparison result and the status corresponding to the first time point; and
if the reference instruction is not filtered out or outputted, executing the step of determining whether the speech interference occurs based on the comparison result and the status corresponding to the first time point.

7. The method for filtering out speech interference of claim 1, wherein the first time point and the second time point are the individual end time points of the reference instruction and the current instruction respectively.

8. The method for filtering out speech interference of claim 1 further comprising:
when the reference instruction does not exist, determining whether an interval between an initial time point of the speech input and the second time point exceeds the time threshold;
if the interval between the initial time point of the speech input and the second time point exceeds the time threshold, setting the second time point to be corresponding to the idle status; and
if the interval between the initial time point of the speech input and the second time point does not exceed the time threshold, setting the second time point to be corresponding to the valid instruction status.

9. The method for filtering out speech interference of claim 1 further comprising:
when an instruction recognized from the speech input is decided to be outputted, adding a preset waiting time to an end time point of the instruction to be an output time point of the instruction.

10. The method for filtering out speech interference of claim 1, wherein the probability distribution model is a Poisson distribution model.

11. An non-transitory computer readable recording device storing a plurality of programming codes, wherein when the programming codes are loaded to a micro-processing unit, the micro-processing unit executes the programming codes so as to complete the steps of:
defining a time threshold based on a probability distribution model by the micro-processing unit;
when a current instruction is recognized, by the micro-processing unit, from a speech input received by a microphone, obtaining a reference instruction recognized from the speech input by the micro-processing unit, wherein the current instruction is recognized right after the reference instruction, the reference instruction and the current instruction correspond to a first time point and a second time point respectively;
determining whether speech interference occurs according to a comparison result and a status corresponding to the first time point by the micro-processing unit, wherein the comparison result is generated by comparing the time threshold with a time interval between the first time point and the second time point, and the status corresponding to the first time point being set based on a recognition status of the speech input recognized at the first time point, wherein the status is one of a plurality of statuses, and the statuses at least comprise a first status, a second status, and a third status;
filtering out the reference instruction and the current instruction by the micro-processing unit if the speech interference occurs; and
outputting one of the reference instruction and the current instruction by the micro-processing unit if the speech interference does not occurs.

12. The non-transitory computer readable recording device of claim 11, wherein the first status is a valid instruction status, the second status is an interference status, and the third status is an idle status, and wherein the micro-processing unit further executes the programming codes to complete the steps of:
if the interval between the first time point and the second time point does not exceed the time threshold and if the first time point corresponds to the interference status, determining that the speech interference occurs and setting the second time point to be corresponding to the interference status;
if the interval between the first time point and the second time point does not exceed the time threshold and if the first time point corresponds to the valid instruction status, when the reference instruction is different from the current instruction, determining that the speech interference occurs and setting the second time point to be corresponding to the interference status; and
if the interval between the first time point and the second time point exceeds the time threshold and if the first time point corresponds to the interference status, determining that the speech interference occurs and setting the second time point to be corresponding to the idle status.

13. The non-transitory computer readable recording device of claim 12, wherein the micro-processing unit further executes the programming codes to complete the steps of:
if the interval between the first time point and the second time point does not exceed the time threshold and if the first time point corresponds to the valid instruction status, when the reference instruction is the same as the current instruction, determining that the speech interference has not occurred and setting the second time point to be corresponding to the idle status; and
if the interval between the first time point and the second time point exceeds the time threshold and if the first time point corresponds to the valid instruction status, determining that the speech interference has not occurred and setting the second time point to be corresponding to the idle status.

14. The non-transitory computer readable recording device of claim 13, wherein the micro-processing unit further executes the programming codes to complete the steps of:
when the interval between the first time point and the second time point does not exceed the time threshold, selectively outputting the reference instruction or the current based on a preset rule; and
when the interval between the first time point and the second time point exceeds the time threshold, outputting the reference instruction.

15. The non-transitory computer readable recording device of claim 13, wherein the micro-processing unit further executes the programming codes to complete the steps of:
if the interval between the first time point and the second time point does not exceed the time threshold and the first time point corresponds to the idle status, setting the second time point to be corresponding to the valid instruction status; and
if the interval between the first time point and the second time point exceeds the time threshold and if the first time point corresponds to the idle status, setting the second time point to be corresponding to the idle status.

16. The non-transitory computer readable recording device of claim 15, wherein the micro-processing unit further executes the programming codes to complete the steps of:
determining whether the reference instruction is filtered out or outputted;
if the reference instruction is filtered out or outputted, determining whether to filter out the current instruction by determining whether the speech interference occurs based on the comparison result and the status corresponding to the first time point; and
if the reference instruction is not filtered out or outputted, executing the step of determining whether the speech interference occurs based on the comparison result and the status corresponding to the first time point.

17. The non-transitory computer readable recording device of claim 11, wherein the micro-processing unit further executes the programming codes to complete the steps of:
when the reference instruction does not exist, determining whether an interval between an initial time point of the speech input and the second time point exceeds the time threshold;
if the interval between the initial time point of the speech input and the second time point exceeds the time threshold, setting the second time point to be corresponding to the idle status; and
if the interval between the initial time point of the speech input and the second time point does not exceed the time threshold, setting the second time point to be corresponding to the valid instruction status.

18. A system for filtering out speech interference comprising:
an output device;
an input device for receiving a speech input;
a storage device for storing a time threshold defined based on a probability distribution model; and
a processor coupled to the output device, the input device, and the storage device,
wherein when the processor recognizes a current instruction from the speech input, the processor obtain a reference instruction recognized from the speech input, in which the current instruction is recognized right after the reference instruction, the reference instruction and the current instruction correspond to a first time point and a second time point respectively,
the processor determines whether speech interference occurs according to a comparison result and a status corresponding to the first time point, wherein the comparison result is generated by comparing the time threshold with a time interval between the first time point and the second time point, and the status corresponding to the first time point being set based on a recognition status of the speech input recognized at the first time point, wherein the status is one of a plurality of statuses, and the statuses at least comprise a first status, a second status, and a third status,
the processor filters out the reference instruction and the current instruction if the speech interference occurs, and the processor controls the output device to output one of the reference instruction and the current instruction if the speech interference does not occurs.

19. The system for filtering out speech interference of claim 18, wherein the first status is a valid instruction status, the second status is an interference status, and the third status is an idle status wherein the processor determines that the speech interference occurs and sets the second time point to be corresponding to the interference status when the interval between the first time point and the second time point does not exceed the time threshold and the first time point corresponds to the interference status,
the processor determines that the speech interference occurs and sets the second time point to be corresponding to the interference status when the interval between the first time point and the second time point does not exceed the time threshold, the first time point corresponds to the valid instruction status, and the reference instruction is different from the current instruction,
the processor determines that the speech interference occurs and sets the second time point to be corresponding to the idle status when the interval between the first time point and the second time point exceeds the time threshold and the first time point corresponds to the interference status,
the processor determines that the speech interference has not occurred and sets the second time point to be corresponding to the idle status when the interval between the first time point and the second time point does not exceed the time threshold, the first time point corresponds to the valid instruction status, and the reference instruction is the same as the current instruction,
the processor determines that the speech interference has not occurred and sets the second time point to be corresponding to the idle status when the interval between the first time point and the second time point exceeds the time threshold and the first time point corresponds to the valid instruction status,
the processor sets the second time point to be corresponding to the valid instruction status when the interval between the first time point and the second time point does not exceed the time threshold and the first time point corresponds to the idle status; and
the processor sets the second time point to be corresponding to the idle status when the interval between the first time point and the second time point exceeds the time threshold and the first time point corresponds to the idle status.

20. The system for filtering out speech interference of claim 19, wherein the processor determines whether the reference instruction is filtered out or outputted, if the reference instruction is filtered out or outputted, the processor determines whether to filter out the current instruction by determining whether the speech interference occurs based on the comparison result and the status corresponding to the first time point, if the reference instruction is not filtered out or outputted, the processor determines whether the speech interference occurs based on the comparison result and the status corresponding to the first time point.

\* \* \* \* \*